United States Patent
Doshi et al.

(10) Patent No.: US 7,406,074 B2
(45) Date of Patent: Jul. 29, 2008

(54) BUNDLING MESSAGES IN COMMUNICATION NETWORKS

(75) Inventors: Bharat T. Doshi, Holmdel, NJ (US); Ramesh Nagarajan, Somerset, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1315 days.

(21) Appl. No.: 10/193,932

(22) Filed: Jul. 12, 2002

(65) Prior Publication Data

US 2004/0008619 A1 Jan. 15, 2004

(51) Int. Cl.
*H04L 12/50* (2006.01)
*G06F 15/173* (2006.01)

(52) U.S. Cl. .................. 370/360; 709/223
(58) Field of Classification Search .............. None
See application file for complete search history.

(56) References Cited

U.S. PATENT DOCUMENTS

| | | | | |
|---|---|---|---|---|
| 5,509,010 A * | 4/1996 | La Porta et al. | ............ | 370/397 |
| 5,663,947 A * | 9/1997 | Wille-Fier et al. | ......... | 370/360 |
| 6,807,170 B1 * | 10/2004 | Dendi et al. | ............ | 370/354 |
| 6,865,180 B1 * | 3/2005 | Waespe | ................ | 370/360 |
| 6,882,655 B1 * | 4/2005 | Isoyama et al. | ........... | 370/415 |
| 6,990,511 B2 * | 1/2006 | Ferwerda et al. | .......... | 709/201 |
| 2002/0196793 A1 * | 12/2002 | Samba et al. | ............ | 370/401 |
| 2003/0018822 A1 * | 1/2003 | Robb et al. | ............... | 709/250 |

\* cited by examiner

*Primary Examiner*—Huy D. Vu
*Assistant Examiner*—Clemence Han

(57) ABSTRACT

Multiple requests to set up and/or tear down connections in a node of a communication network (or multiple failure notifications) are bundled together for transmission within the network. In an "inter-nodal" embodiment, multiple connection requests/failure notifications are bundled together as a single message for transmission between pairs of nodes in the network. In an "intra-nodal" embodiment, multiple connection requests/failure notifications received at one component of a node in the network are bundled together as a single group for forwarding to another component within the same node for implementation. In either case, the bundling of multiple connection requests/failure notifications can reduce the total amount of time required to communicate and implement the desired connection requests/restoration processing. This reduction in time can be critical to the ability of a network to satisfy requirements associated with restoration processing following a network fault.

29 Claims, 6 Drawing Sheets

BUNDLING MESSAGES IN COMMUNICATION NETWORKS

BACKGROUND OF THE INVENTION

1. Field of the Invention

The present invention relates to communication networks, and, in particular, to messages associated with link or node failures and/or setting up and tearing down connections in switches in communication networks.

2. Description of the Related Art

FIG. 1 shows a portion of a communication network 100. In particular, FIG. 1 shows four nodes labeled A, B, C, and D connected by five links labeled L1, L2, L3, L4, and L5. In order to transmit a data signal from Node A to Node C via Node B (i.e., along the path (A-B-C)), the switch fabric at Node B needs to be configured to route the signal received from Node A via Link L1 for transmission via Link L2 to Node C. Conventionally, this is accomplished by Node A transmitting a message to Node B instructing Node B to configure its switch fabric to make a connection that supports the desired communication channel from Node A to Node C. Such a message is referred to herein as a connection set-up request message, because the message contains a request for Node B to set up a connection.

If and when transmission of the signal from Node A to Node C is complete, Node A may transmit a connection tear-down request message to Node B requesting that Node B tear down the corresponding connection in its switch fabric in order to free up that portion of Node B's switch capacity for other communications.

Whenever a message is received at Node B, a component in Node B (e.g., a message decoder) processes the received message to decode and interpret the instructions contained therein (e.g., to determine whether the message contains a connection set-up request or a connection tear-down request). These instructions are then forwarded to another component in Node B (e.g., a switch fabric controller) that is responsible for implementing the instructions, e.g., to either set up or tear down a connection in Node B's switch fabric.

In conventional communication networks, there is a one-to-one correspondence between connection requests and connection request messaging. In other words, every time a different connection is to be set up or torn down, a different connection request message is transmitted from one node to another. Similarly, in conventional communication networks, there is a one-to-one correspondence between the receipt of connection request messages at a node and the forwarding of connection instructions within that node. In other words, every time a node receives a connection request message from another node, a single instance of instruction forwarding occurs, wherein the instruction contained in that message is forwarded to the node component responsible for implementing that instruction.

Such a messaging scheme may be acceptable for communication networks having relatively infrequent messaging and/or where the time that it takes to generate, transmit, and process such messages is not critical. There are situations, however, where a relatively large number of connection requests need to be implemented in a relatively short period of time. One classic example of such a situation occurs during service restoration processing following a failure in the communication network. In such situations, the prior art messaging scheme may not be acceptable.

Referring again to FIG. 1, assume that Link L2 suffers a catastrophic failure (e.g., a cut in the link) that prevents signals from being transmitted directly from Node B to Node C. In such a case, automatic restoration processing may be performed in order to quickly resume service that was interrupted by the failure in Link L2. In one possible implementation, this may involve re-routing all of the signals that were flowing along the path (A→B→C) to flow along the path (A→D→C) instead. In that case, Node D needs to be appropriately configured to provide all of the connections for all of the communications from Node A to Node C.

According to the prior art messaging scheme described above, this would involve the generation, transmission, and processing of a different connection set-up request message for each different communication channel. In general, there is a linear relationship between the number of connection request messages received by a node and the time that it takes for that node to complete all of the processing associated with those messages. If one connection request message takes X milliseconds to process, then 1000 connection request messages take about 1000X milliseconds to process. When the number of different connection request messages is sufficiently large, a node implementing the prior art messaging scheme might not be able to complete the restoration processing within the allocated time period.

SUMMARY OF THE INVENTION

Certain embodiments of the present invention are directed to messaging schemes for communication networks that require less time than those of the prior art. According to one possible aspect of these messaging schemes, two or more connection requests are bundled together into a single message for transmission from one node to another in a communication network. In that case, the receiving node needs to decode only a single message to recover and then implement the two or more connection requests. Such request bundling can reduce the amount of time required to process multiple connection requests at a node.

According to another possible aspect of these messaging schemes, when a node detects an upstream failure, the node bundles two or more failure notifications together into a single message for transmission to a node upstream of the failure. In prior-art systems, the downstream node would transmit a different failure notification message for each different communication channel between the upstream and downstream nodes that was affected by the failure. Such bundling of failure notifications can reduce the time required to perform the resulting restoration processing, which may also, but does not have to, involve the bundling of multiple connection requests.

Yet another possible aspect of these messaging schemes relates to the processing of connection requests within a node. According to this aspect, connection request messages are received and decoded at one component within a node. The corresponding connection requests are then buffered for forwarding as a bundle of two or more connection requests to another component within the node that is responsible for implementing the connection requests. Here, too, such request bundling can reduce the amount of time required to process multiple connection requests within a node.

In one embodiment, the present invention is a method for generating and transmitting messages in a communication network. At a first component of the communication network, a plurality of connection requests/failure notifications are combined into a bundled message. When the bundled message comprises a plurality of connection requests, each of the connection requests corresponds to a request to configure a first switch node of the communication network for a different connection. When the bundled message comprises a plurality of failure notifications, each of the failure notifications corresponds to failure of a different connection in the communication network. The bundled message is transmitted to a second component of the communication network, where the second component recovers the plurality of connection requests/failure notifications from the bundled message. When the bundled message comprises a plurality of connection requests, the second component implements the plurality of connection requests to configure the first switch node for a plurality of connections. When the bundled message comprises a plurality of failure notifications, the second component initiates restoration processing for a plurality of connections.

In another embodiment, the present invention is a method for receiving and processing messages a communication network. A bundled message is received at a second component of the communication network, wherein the bundled message was generated at a first component of the communication network and transmitted from the first component to the second component, and the bundled message comprises a plurality of connection requests/failure notifications. When the bundled message comprises a plurality of connection requests, each of the connection requests corresponds to a request to configure a first switch node of the communication network for a different connection. When the bundled message comprises a plurality of failure notifications, each of the failure notifications corresponds to failure of a different connection in the communication network. At the second component, the plurality of connection requests/failure notifications are recovered from the bundled message. When the bundled message comprises a plurality of connection requests, implementing the plurality of connection requests to configure the first switch node for a plurality of connections. When the bundled message comprises a plurality of failure notifications, initiating restoration processing for a plurality of connections.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
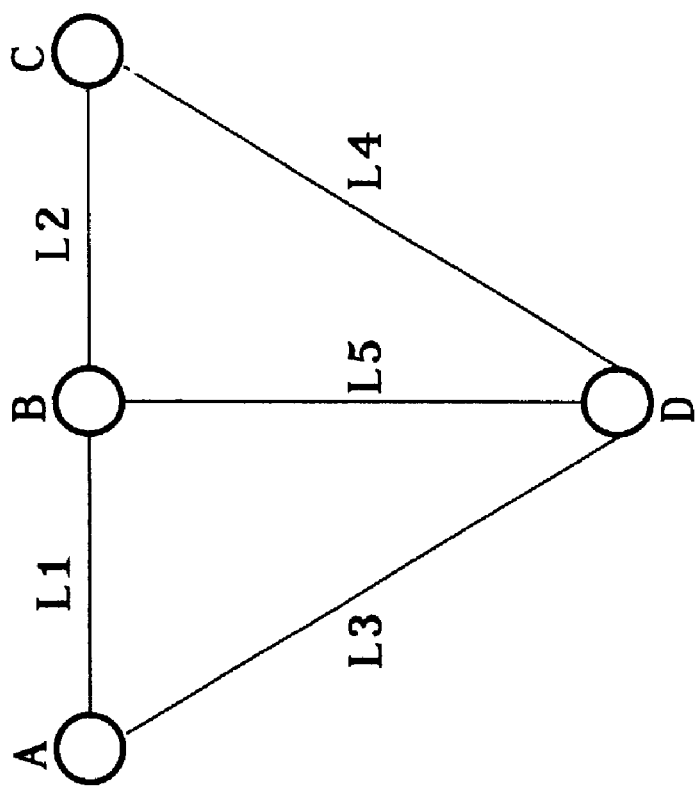
FIG. 1 shows a portion of a communication network.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

One aspect of the present invention is related to connection requests related to the setting up and tearing down of connections in communication networks. As used in this specification, the term "communication network" refers to any distributed network of two or more nodes in which data signals are transmitted between different nodes, where the signals may convey any type of information including voice and/or image (e.g., video) in addition to or instead of data. The networks of the present invention may involve any suitable protocol for transmitting signals including synchronous and/or asynchronous transport protocols, and the signals transmitted therein may be electrical and/or optical signals. Although the present invention is described below in the context of connection requests, the present invention can also be implemented for other types of messaging, such as the bundling of multiple failure notifications into a single message for transmission from a node downstream of a failure to a node upstream of the failure, where each failure notification in the message corresponds to a different communication channel between the two nodes.

One of the critical parameters that determines restoration speed in distributed mesh restoration is the total traffic in the network (for example, the number of wavelength connections in an optical network), since that determines the number of connections to be restored. Thus, the traffic demand will determine signaling traffic needed to establish new routes, the number of cross connects needed at a node, and other factors. Both increase in signaling traffic and increase in the number of cross connects will lead to increased delay. It is desirable to keep this delay from growing unbounded. The present invention is directed to a signaling technique, referred to herein as demand bundling, that is scalable.

In one embodiment, demand bundling groups demands between node pairs into bundles of N demands. The demands in a group are then routed together along the same network path. The demands in a group also share an identical restoration route. This bundle is also sometimes referred to as a protection group. As a result, signaling for the group of demands can be carried out jointly without requiring a separate connection request for each of the N demands in the group. This applies to both the primary and the restoration path set-up. As a result, there is an N-fold reduction in the number of signaling messages that need to be processed to set up and restore the N connections. If the traffic between the node pairs grew from unity to N, this suggests that the restoration time remains the same regardless of N. In practice, it will be difficult to achieve near constant restoration time, bit it should be possible to come close to it with this bundling scheme.

The present invention can be implemented in different ways, depending on the particular requirements of the different communication networks in which it is implemented. Some of these different implementations will be described in the context of the following flow diagrams. Each of these implementations is described in the context of a communication network having the same topology shown in FIG. 1. Those skilled in the art will understand that each of these implementations can be modified for application to other communication network topologies. FIG. 2 shows a flow diagram of the processing corresponding to one possible implementation of the present invention. The processing shown in FIG. 2 corresponds to the set-up and/or tear-down of connections in Node B of FIG. 1 to support the transmission of signals from Node A to Node C along path (A→B→C). In particular, the processing of FIG. 2 starts at step 202 with Node A receiving two or more connection requests relating to connections in node B associated with the path (A→B→C), where these connection requests may be any combination of connection set-up and connection tear-down requests, including all of one type. Depending on the implementation and/or the situation, the connection requests may be received at Node A "all at once" or over some relatively long period of time.

In any case, after receiving a plurality of such connection requests, Node A bundles the connections requests into a single message (step 204) and transmits the resulting bundled message to Node B (step 206). Depending on the implementation details of network 100 of FIG. 1, messages may be transmitted between nodes using either in-band signaling (e.g., from Node A to Node B via Link L1) or out-of-band signaling (e.g., using a link not shown in FIG. 1).

When received, Node B decodes the bundled message to recover the plurality of connection requests (step 208). Node B then implements those connection requests to set up and/or tear down the corresponding connections (step 210). Because Node B has to decode only a single message, the overall time required to decode and implement the connection requests will typically be shorter than the amount of time required to decode multiple "single request" messages and implement the equivalent connection requests using the prior art messaging scheme described previously.

Figure 2:
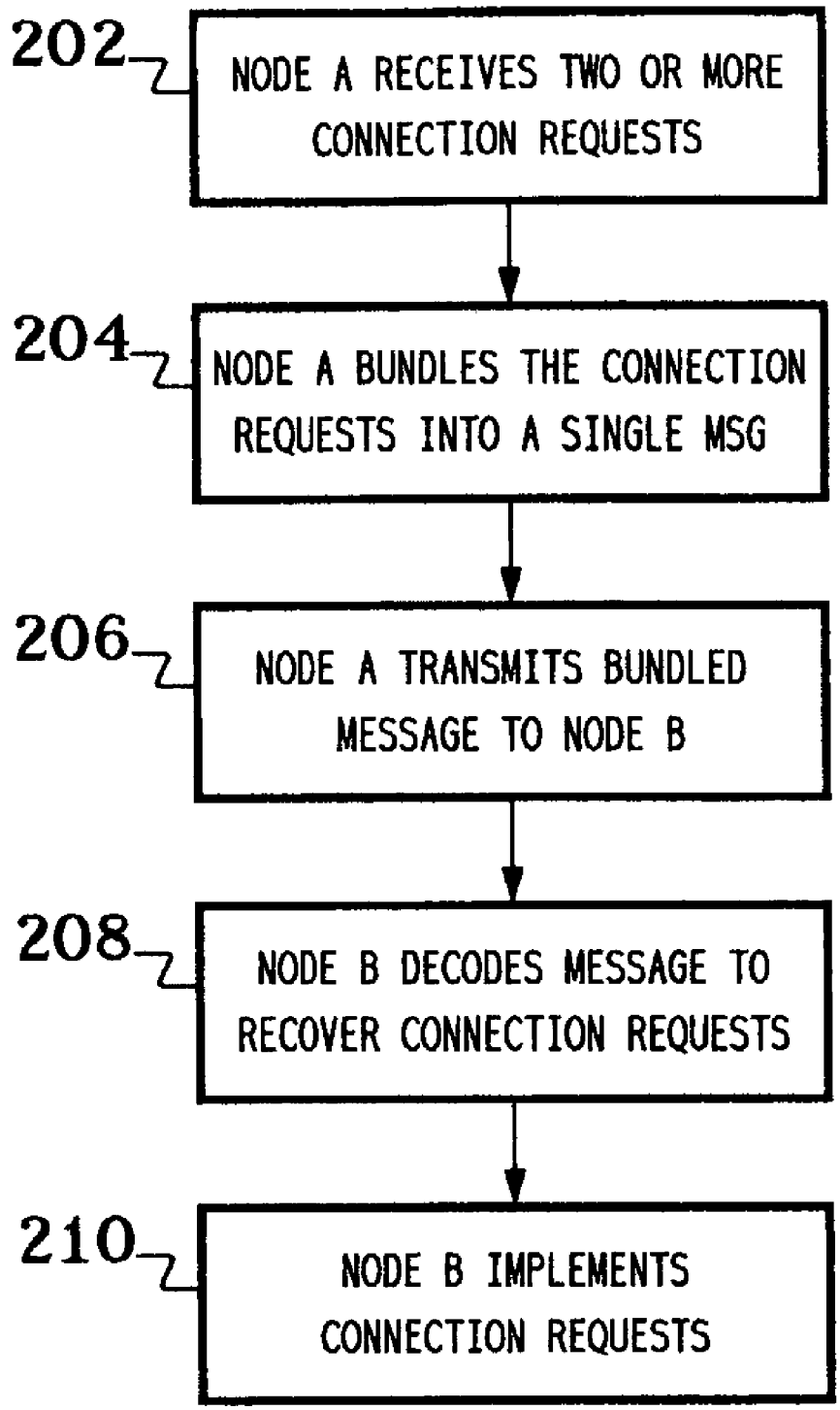
FIG. 2 shows a flow diagram of the processing corresponding to one possible implementation of the present invention.
Figure 3:
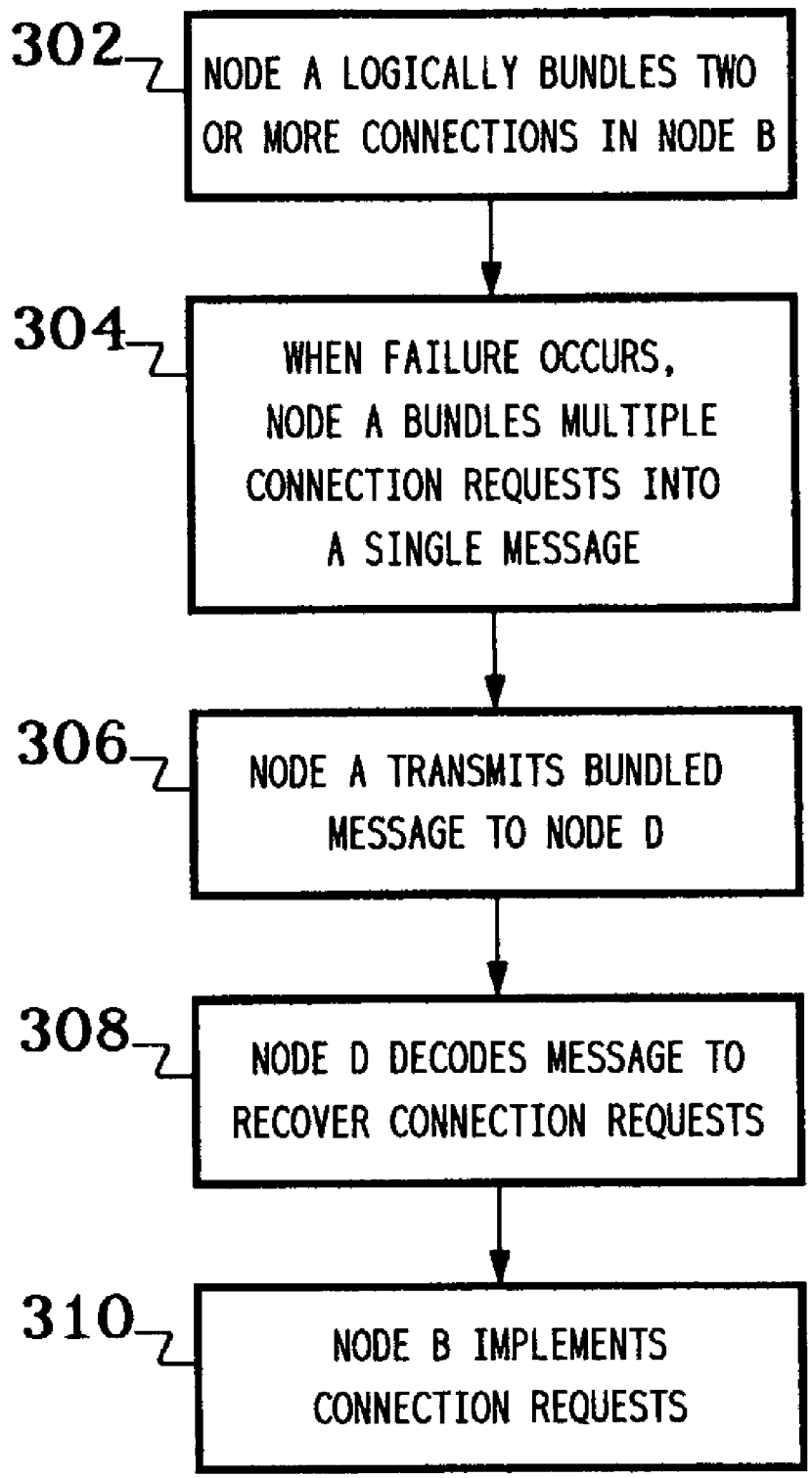
FIG. 3 shows a flow diagram of the processing corresponding to another possible implementation of the present invention.

FIG. 3 shows a flow diagram of the processing corresponding to another possible implementation of the present invention. The processing shown in FIG. 3 corresponds to restoration processing involving the set-up of connections in Node D of FIG. 1 to support the transmission of signals from Node A to Node C along path (A→D→C) following a failure along path (A→B→C) (e.g., a cut in Link L2). The processing of FIG. 3 may be implemented independent of whether the primary service connections at node B were set up using message bundling (as in FIG. 2) or a conventional "single request" messaging scheme involving one message for each connection set-up request.

In particular, the processing of FIG. 3 starts at step 302 with Node A logically bundling two or more existing connections in Node B that are associated with the path (A→B→C). As connections in Node B are set up and torn down over time, the logical bundling of step 302 is updated accordingly. If and when a failure in path (A→B→C) occurs, based on the logical bundling of Node B connections, node A bundles two or more set-up requests for connections in node D for the path (A→D→C) into a single message (step 304) and transmits the resulting bundled message to Node D (step 306).

The processing at Node D is analogous to the processing at Node B in FIG. 2. In particular, when received, Node D decodes the bundled message to recover the plurality of connection requests (step 308). Node D then implements those connection requests to set up the corresponding connections (step 310). Here, too, because Node D has to decode only a single message, the overall time required to decode and implement the connection requests will typically be shorter than the amount of time required to decode multiple "single request" messages and implement the equivalent connection requests using the prior art messaging scheme described previously. This time reduction may be critical in meeting the restoration processing deadline for the communication network.

The processing of FIGS. 2 and 3 may be said to involve a priori message bundle generation because the decision as to how to organize different connection requests into two or more different bundled messages may be made well in advance of the time required to transmit the resulting bundled messages. There are other situations where those bundling decisions are made "in real time," just prior to the transmission of the resulting bundled messages. Such situations may be said to involve a posteriori message generation.

Figure 4:
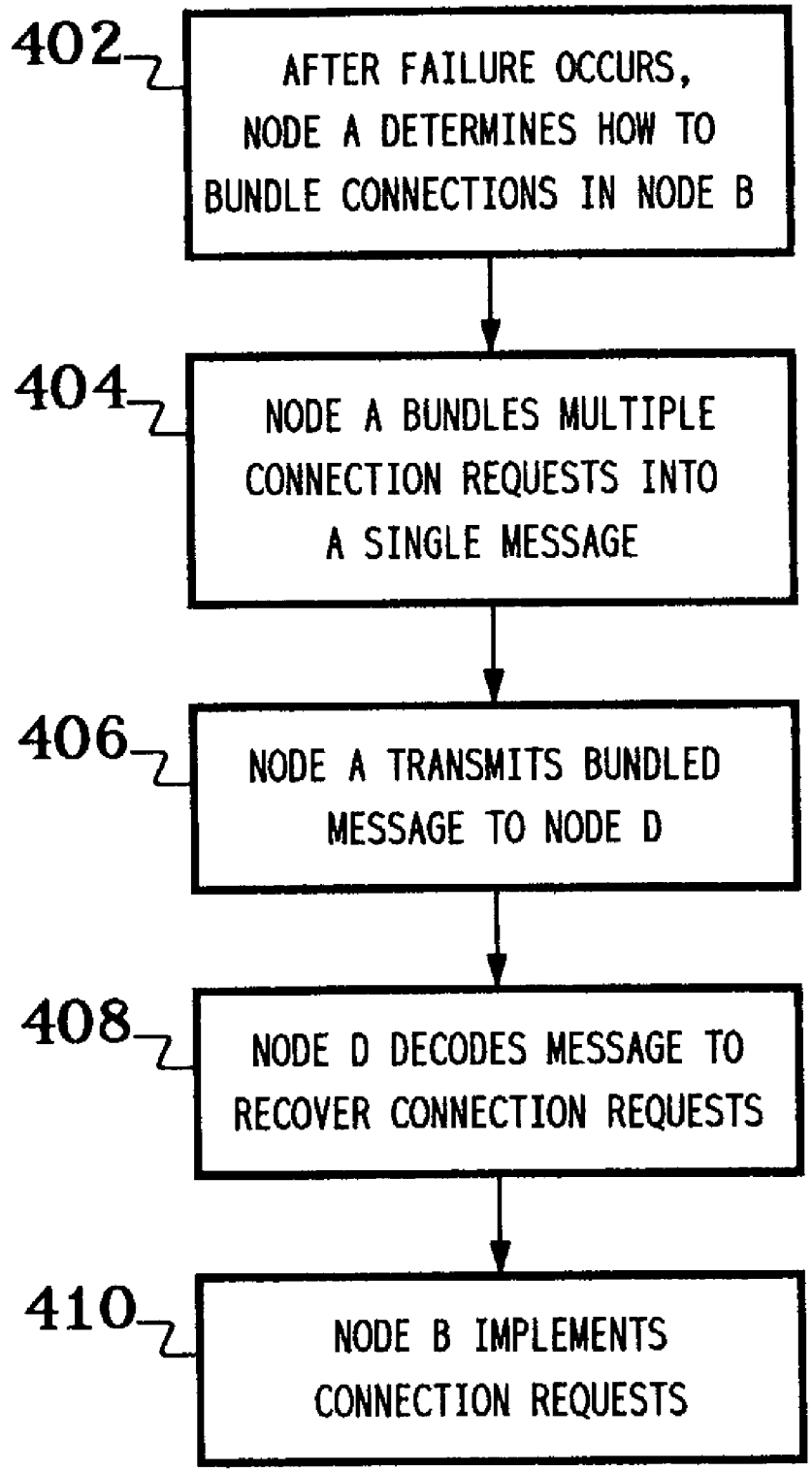
FIG. 4 shows a flow diagram of the processing corresponding to an embodiment of the present invention involving a posteriori message generation.

FIG. 4 shows a flow diagram of the processing corresponding to an embodiment of the present invention involving a posteriori message generation. Like the processing of FIG. 3, the processing of FIG. 4 corresponds to restoration processing involving the set-up of connections in Node D of FIG. 1 to support the transmission of signals from Node A to Node C along path (A→D→C) following a failure along path (A→B→C) (e.g., a cut in Link L2). The difference between FIG. 3 and FIG. 4 is that the decision as to how to organize the multiple connection requests into one or more bundles is made in real time, i.e., after the failure in the primary service path has occurred. Like FIG. 3, the processing of FIG. 4 may be implemented independent of whether the primary service connections at node B were set up using message bundling (as in FIG. 2) or a conventional messaging scheme involving one message for each connection set-up request.

In particular, the processing of FIG. 4 starts only after a failure has occurred in the main service path (A→B→C). After that failure occurs, Node A then determines how to bundle connection requests for Node D to replace the connections being handled by Link 2 at the time the failure occurred (step 402). Depending on the implementation and/or the situation, this determination may result in one or more bundled messages, each of which contains two or more connection requests. In addition to the one or more bundled messages, this determination could also result in one or more conventional "single request" messages being generated. (Of course, in particular situations, the determination may result in only conventional "single request" messages.) In any case, for each bundle of two or more connection requests, Node A bundles the multiple connection requests into a single message (step 404) and transmits the resulting bundled message to Node D (step 406).

The processing at Node D may be identical to the processing at Node D in FIG. 3. In particular, when received, Node D decodes each bundled message to recover the plurality of connection requests (step 408). Node D then implements those connection requests to set up the corresponding connections (step 410). Here, too, because Node D has to decode only a single message for each bundle of connection requests, the overall time required to decode and implement the connection requests will typically be shorter than the amount of time required to decode multiple "single request" messages and implement the equivalent connection requests using the prior art messaging scheme described previously. As before, this time reduction may be critical in meeting the restoration processing deadline for the communication network.

The processing of FIGS. 2-4 correspond to the generation of bundled connection request messages for transmission between two different nodes in a communication network. As such, such messaging may be referred to as "inter-nodal" messaging. The present invention may also be implemented in the context of "intra-nodal" messaging, in which two or more connection requests are bundled together for "transmission" (i.e., forwarding) between different components within a single node of a communication network.

Figure 5:
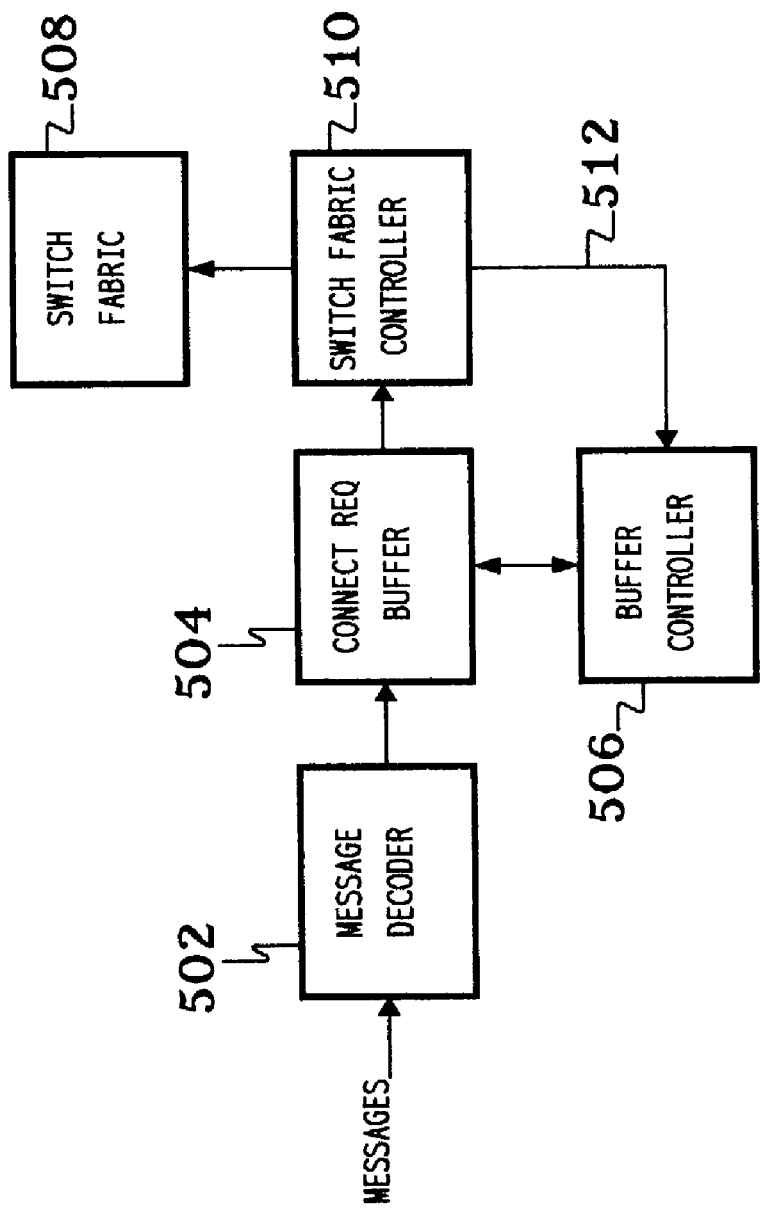
FIG. 5 shows a high-level block diagram of a portion of a node, such as Node D of FIG. 1.

FIG. 5 shows a high-level block diagram of a portion of a node, such as Node D of FIG. 1. As shown in FIG. 5, Node D comprises a message decoder 502, a connection request buffer 504, a buffer controller 506, a switch fabric 508, and a switch fabric controller 510. Those skilled in the art will appreciate that the particular configuration shown in FIG. 5 is exemplary and that the present invention can also be implemented in the context of other node architectures.

In general, message decoder 502 decodes connection request messages received at Node D from other nodes and stores the recovered connection requests in buffer 504. Buffer controller 506 determines when to forward (i.e., transmit) connection requests from buffer 504 to switch fabric controller 510, which implements the connection requests to set up and/or tear down connections in switch fabric 508.

Figure 6:
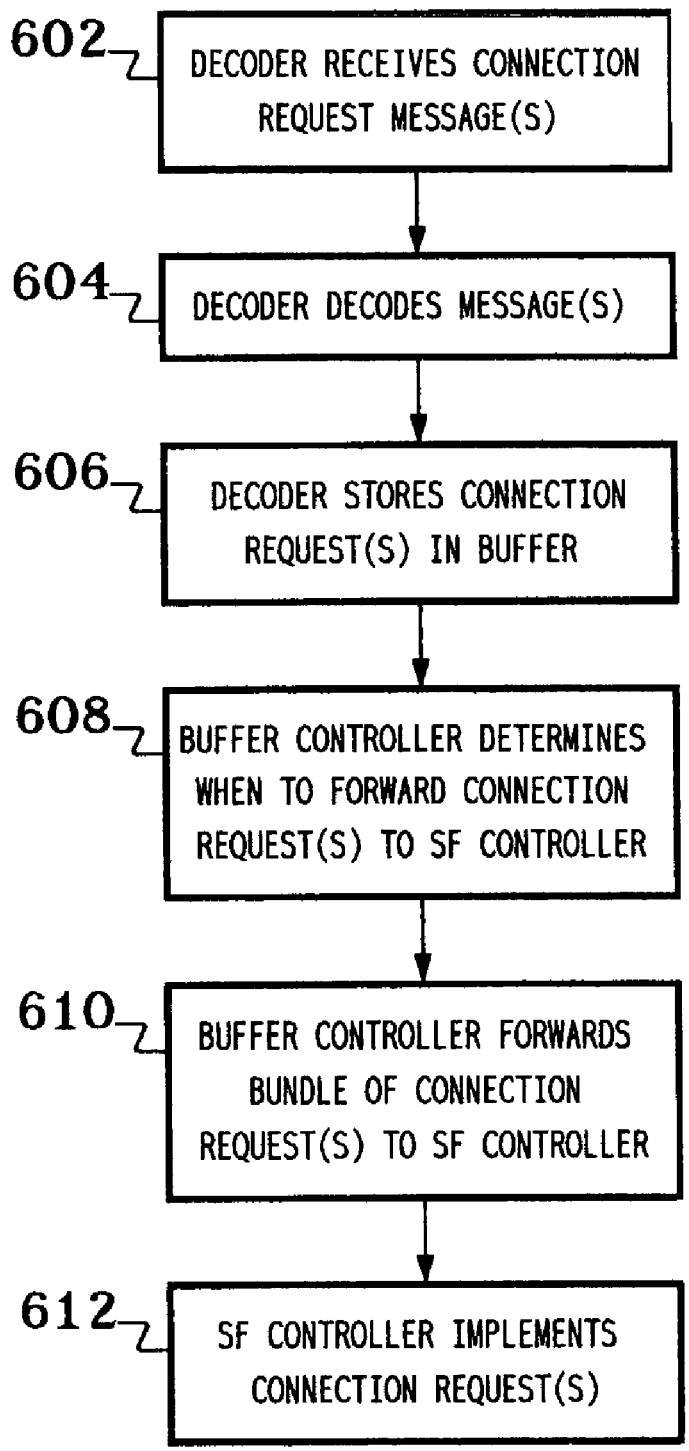
FIG. 6 shows a block diagram of the intra-nodal message processing within Node D of FIG. 5, according to one embodiment of the present invention.

FIG. 6 shows a block diagram of the intra-nodal message processing within Node D of FIG. 5, according to one embodiment of the present invention. In particular, message decoder 502 of Node D receives one or more connection set-up and/or tear-down request messages (step 602). Note that, in general, (i) the messages may be transmitted from one or more different nodes in the network, (ii) the messages may correspond to connections in Node D that are associated with one or more different source-destination pairs, and (iii) the messages may include one or more bundled connection request messages (as in FIGS. 2-4) and/or one or more conventional "single request" messages.

Decoder 502 decodes the received message(s) (step 604) and stores the recovered connection request(s) in connection request buffer 504 (step 606). Buffer controller 506 monitors the status of buffer 504 and determines when to forward connection requests to switch fabric controller 510 (step 608). When such a determination is made, buffer controller 506 organizes one or more of the buffered connection requests into a single bundle for forwarding to switch fabric controller 510 (step 610), which implements the received connection request(s) to set-up and/or tear-down one or more connections in switch fabric 508 (step 612).

Depending on the particular implementation, the determination made by buffer controller 506 of when to forward buffered connection requests from buffer 504 to switch fabric controller 510 may be based on different criteria. In one embodiment, buffer controller 506 maintains a timer and transmits a bundle of connection requests at fixed intervals. Depending on the implementation, the number of connection requests bundled together may be all that are currently buffered in buffer 504 or a limit may be placed on the number that may be transmitted for any particular control cycle.

In another implementation, buffer controller 506 may transmit a bundle of connection requests whenever the number of buffered connection requests reaches a specified threshold value. Here, too, buffer controller 506 may maintain a timer to ensure that connection requests do not get too delayed before they are forwarded to switch fabric controller 510 in the event that only a few connection requests (i.e., less than the threshold value) are received during the timer period.

In yet another implementation, buffer controller 506 receives feedback information from switch fabric controller 510 (via path 512 in FIG. 5) as to how busy it is. In that case, buffer controller 506 can use that information to determine how many connection requests (if any) to bundle together for forwarding to switch fabric controller 510, where the more busy switch fabric controller 510 is, the fewer connection requests will be forwarded by buffer controller 506.

Those skilled in the art will understand that two or more of these criteria may be combined in any particular implementation of buffer controller 506.

Although the steps in FIG. 6 are shown as a sequence, in preferred implementations, all of the different steps are performed continuously and contemporaneously. That is, message decoder 502 continues to receive and decode messages and store the recovered connection requests into buffer 504, while buffer controller 506 determines when to forward bundles of buffered connection requests to switch fabric controller 510, which continues to implement whatever connection requests it has received.

Those skilled in the art will understand that two or more of the different implementations described in the context of FIGS. 2-6 may be combined in any given embodiment of the present invention.

In general, there is a tradeoff associated with inter-nodal demand bundling. Since the N demands are routed as a group, one loses flexibility in load balancing the traffic between different source-destination paths. However, by careful choice of N as a function of traffic volume, one can achieve a desired tradeoff between network capacity penalty and restoration time.

Experimental Results

A study was conducted on a nationwide network for a typical large service-provider to determine the benefits of inter-nodal demand bundling. Prior to discussing the study results, some new terminology is introduced. Note that, in the event of a specific fault, a particular subset of demands gets disrupted. Depending on the alternate paths of these demands, each node in the network has to perform a certain number of cross connections (XCs). These cross-connection requests and associated signaling messages at the node are processed sequentially, and each one takes a finite duration of time. The number of XC request to be processed at a node for each failure is referred to as the XC load at that node for that failure. The maximum XC load at a node across all possible failures provides an indication of the worst-case restoration time. This maximum XC load and the associated worst-case restoration time can be reduced by the demand bundling of the present invention.

Two different traffic levels were considered for the same network. The first level represents a traffic growth of 40 times the current traffic in this representative service provider's network. The second level corresponds to an aggressive traffic growth of 400 times the current traffic. For both cases, the traffic was routed and the maximum cross-connect load was computed for each node, in event of failure. Table I shows the minimum, maximum, and average of the maximum XC loads across all the nodes when no bundling of demands was carried out. Note that, in this case, the XC load numbers for the x400 traffic case are nearly 10 times those for the x40 case. Thus, the XC load grows linearly in the traffic levels, which is an undesirable situation.

TABLE I

Cross-connect load without bundled routing for x40 and x400 traffic scenarios

| a) x40 traffic | | b) x400 traffic | |
|---|---|---|---|
| Minimum | 19 | Minimum | 211 |
| Maximum | 374 | Maximum | 5188 |
| Average | 122.5656 | Average | 1259.205 |

The same traffic was then routed with bundling of demands between source-destination pairs of nodes. Table II shows the same results for the two traffic levels with bundling. The contribution to the cross-connect load of a bundled demand is assumed to be unity. That is, the best case is assumed where a demand bundle incurs the same amount of nodal processing as a single original demand. The bundling itself was done in a manner to minimize any negative impact on network capacity. Demands were bundled only in cases where the source-destination traffic was relatively large, e.g., 100 or more units.

These demands would then be bundled into groups of about 10 to 20 demands each. Given the limited number of source-destination paths in typically sparse fiber networks, this still provides plenty of opportunity for load balancing without capacity penalty.

TABLE II

Cross-connect load with bundled routing for ×40 and ×400 traffic scenarios

| a) ×40 traffic | | b) ×400 traffic | |
|---|---|---|---|
| Minimum | 17 | Minimum | 21 |
| Maximum | 297 | Maximum | 340 |
| Average | 112.8443 | Average | 130.5328 |

The total capacity needs with bundled routing were also compared to the results from unbundled routing. The capacity penalty was found to be very small. However, Table II indicates that the cross-connect load for the x400 traffic case is dramatically reduced compared to the unbundled routing scenario. There is also a small reduction for the x40 case, but this is necessarily small as a result of the limited opportunity/needs for bundling at lower traffic levels. The cross-connect load for the x400 case is only marginally higher, about 1.25 times, than for the x40 traffic compared to the traffic growth of about 10 times. This suggests that bundling provides excellent scalability in restoration times with high traffic levels.

Although the present invention has been described in the context of the bundling of multiple connection requests for transmission from a source node to a destination node, the present invention is not so limited. In general, any node in a communication network (including intermediate nodes) may bundle two or more connection requests (or failure notifications) for transmission as a single message. In general, a node in a communication network may (1) receive one or more incoming individual (i.e., unbundled) connection requests/failure notifications and/or one or more incoming bundled messages, (2) reorganize the various connection requests/failure notifications contained in those individual and bundled messages, and (3) transmit one or more outgoing individual messages and/or one or more outgoing bundled messages, where the reorganization may involve unbundling and/or bundling the various connection requests/failure notifications to form new individual and/or bundled messages.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method for generating and transmitting messages in a communication network, comprising the steps of:
(a) combining, at a first component of the communication network, a plurality of messages into a bundled message, wherein:
the plurality of messages comprises one of (i) at least two connection requests, (ii) at least one connection request and at least one failure notification, and (iii) at least two failure notifications;
when the bundled message comprises a plurality of connection requests, each of the connection requests corresponds to a request to configure a first switch node of the communication network for a different connection; and
when the bundled message comprises a plurality of failure notifications, each of the failure notifications corresponds to failure of a different connection in the communication network; and
(b) transmitting the bundled message to a second component of the communication network, wherein:
the second component recovers the plurality of messages from the bundled message;
when the bundled message comprises a plurality of connection requests, the second component implements the plurality of connection requests to configure the first switch node for a plurality of connections;
when the bundled message comprises a plurality of failure notifications, the second component initiates restoration processing for a plurality of connections; and
each of the first and second components is part of a switch node in the communication network.

2. The invention of claim 1, wherein the bundled message comprises a plurality of failure notifications.

3. The invention of claim 1, wherein the bundled message comprises one or more connection set-up requests.

4. The invention of claim 3, wherein the bundled message further comprises at least one connection tear-down request.

5. The invention of claim 1, wherein:
the second component is part of the first switch node; and
the first component is part of another switch node in the communication network.

6. The invention of claim 5, wherein the plurality of messages correspond to a single source-destination pair.

7. The invention of claim 1, wherein the bundled message comprises a plurality of connection requests that are part of restoration processing in the communication network.

8. The invention of claim 1, wherein both the first and second components are part of the first switch node, wherein the first component buffers the plurality of messages as they are received at the first switch node from one or more other switch nodes in the communication network.

9. The invention of claim 8, wherein the first component combines the plurality of messages into the bundled message after a specified time has elapsed.

10. The invention of claim 8, wherein the first component combines the plurality of messages into the bundled message after a specified number of messages have been received.

11. The invention of claim 8, wherein:
the first component receives information from the second component about its current processing capacity; and
the first component combines the plurality of messages into the bundled message when the second component currently has processing capacity to handle the bundled message.

12. The invention of claim 8, wherein the plurality of messages are received from two or more other switch nodes in the communication network and correspond to two or more different source-destination pairs.

13. The invention of claim 1, wherein step (a) comprises, at the first component, the steps of:
(a1) receiving, from another switch node of the communication network, a first bundled message comprising a first set of messages; and (a2) generating a second bundled message comprising a subset of the first set of messages as well as one or more other messages received from one or more other switch nodes of the communication network, wherein the second bundled message is transmitted to the second component.

14. A method for receiving and processing messages in a communication network, comprising the steps of:
   (a) receiving a bundled message at a second component of the communication network, wherein:
      the bundled message was generated at a first component of the communication network and transmitted from the first component to the second component;
      the bundled message comprises a plurality of messages;
      the plurality of messages comprises one of (i) at least two connection requests, (ii) at least one connection request and at least one failure notification, and (iii) at least two failure notifications;
      when the bundled message comprises a plurality of connection requests, each of the connection requests corresponds to a request to configure a first switch node of the communication network for a different connection;
      when the bundled message comprises a plurality of failure notifications, each of the failure notifications corresponds to failure of a different connection in the communication network; and
      each of the first and second components is part of a switch node in the communication network;
   (b) recovering, at the second component, the plurality of messages from the bundled message;
   (c) when the bundled message comprises a plurality of connection requests, implementing the plurality of connection requests to configure the first switch node for a plurality of connections; and
   (d) when the bundled message comprises a plurality of failure notifications, initiating restoration processing for a plurality of connections.

15. The invention of claim 14, wherein the bundled message comprises a plurality of failure notifications.

16. The invention of claim 14, wherein the bundled message comprises one or more connection set-up requests.

17. The invention of claim 16, wherein the bundled message further comprises at least one connection tear-down request.

18. The invention of claim 14, wherein:
   the second component is part of the first switch node; and
   the first component is part of another switch node in the communication network.

19. The invention of claim 18, wherein the plurality messages correspond to a single source-destination pair.

20. The invention of claim 14, wherein the bundled message comprises a plurality of connection requests that are part of restoration processing in the communication network.

21. The invention of claim 14, wherein both the first and second components are part of the first switch node, wherein the first component buffers the plurality of connection requests as they are received at the first switch node from one or more other switch nodes in the communication network.

22. The invention of claim 21, wherein the first component combines the plurality of messages into the bundled message after a specified time has elapsed.

23. The invention of claim 21, wherein the first component combines the plurality of messages into the bundled message after a specified number of messages have been received.

24. The invention of claim 21, wherein:
   the first component receives information from the second component about its current processing capacity; and
   the first component combines the plurality of messages into the bundled message when the second component currently has processing capacity to handle the bundled message.

25. The invention of claim 21, wherein the plurality messages are received from two or more other switch nodes in the communication network and correspond to two or more different source-destination pairs.

26. A method for generating and transmitting messages in a communication network, comprising the steps of:
   (a) combining, at a first component of the communication network, a plurality of messages into a bundled message, wherein:
      the plurality of messages comprises one of (i) at least two connection requests, (ii) at least one connection request and at least one failure notification, and (iii) at least two failure notifications;
      when the bundled message comprises a plurality of connection requests, each of the connection requests corresponds to a request to configure a first switch node of the communication network for a different connection; and
      when the bundled message comprises a plurality of failure notifications, each of the failure notifications corresponds to failure of a different connection in the communication network; and
   (b) transmitting the bundled message to a second component of the communication network, wherein:
      the second component recovers the plurality of messages from the bundled message;
      when the bundled message comprises a plurality of connection requests, the second component implements the plurality of connection requests to configure the first switch node for a plurality of connections;
      when the bundled message comprises a plurality of failure notifications, the second component initiates restoration processing for a plurality of connections; and
      the bundled message comprises at least one of a failure notification, a connection set-up request, and a connection tear-down request.

27. A method for receiving and processing messages in a communication network, comprising the steps of:
   (a) receiving a bundled message at a second component of the communication network, wherein:
      the bundled message was generated at a first component of the communication network and transmitted from the first component to the second component;
      the bundled message comprises a plurality of messages;
      the plurality of messages comprises one of (i) at least two connection requests, (ii) at least one connection request and at least one failure notification, and (iii) at least two failure notifications;
      when the bundled message comprises a plurality of connection requests, each of the connection requests corresponds to a request to configure a first switch node of the communication network for a different connection;
      when the bundled message comprises a plurality of failure notifications, each of the failure notifications corresponds to failure of a different connection in the communication network; and
      the bundled message comprises at least one of a failure notification, a connection set-up request, and a connection tear-down request;

(b) recovering, at the second component, the plurality of messages from the bundled message;

(c) when the bundled message comprises a plurality of connection requests, implementing the plurality of connection requests to configure the first switch node for a plurality of connections; and (d) when the bundled message comprises a plurality of failure notifications, initiating restoration processing for a plurality of connections.

28. A method for generating and transmitting messages in a communication network, comprising the steps of:

(a) combining, at a first component of the communication network, a plurality of messages into a bundled message, wherein:

the plurality of messages comprises one of (i) at least two connection requests, (ii) at least one connection request and at least one failure notification, and (iii) at least two failure notifications;

when the bundled message comprises a plurality of connection requests, each of the connection requests corresponds to a request to configure a first switch node of the communication network for a different connection; and when the bundled message comprises a plurality of failure notifications, each of the failure notifications corresponds to failure of a different connection in the communication network; and (b) transmitting the bundled message to a second component of the communication network, wherein:

the second component recovers the plurality of messages from the bundled message;

when the bundled message comprises a plurality of connection requests, the second component implements the plurality of connection requests to configure the first switch node for a plurality of connections;

when the bundled message comprises a plurality of failure notifications, the second component initiates restoration processing for a plurality of connections; and the bundled message comprises a plurality of connection requests that are part of restoration processing in the communication network.

29. A method for receiving and processing messages in a communication network, comprising the steps of:

(a) receiving a bundled message at a second component of the communication network, wherein:

the bundled message was generated at a first component of the communication network and transmitted from the first component to the second component;

the bundled message comprises a plurality of messages;

the plurality of messages comprises one of (i) at least two connection requests, (ii) at least one connection request and at least one failure notification, and (iii) at least two failure notifications:

when the bundled message comprises a plurality of connection requests, each of the connection requests corresponds to a request to configure a first switch node of the communication network for a different connection;

when the bundled message comprises a plurality of failure notifications, each of the failure notifications corresponds to failure of a different connection in the communication network; and the bundled message comprises a plurality of connection requests that are part of restoration processing in the communication network;

(b) recovering, at the second component, the plurality of messages from the bundled message;

(c) when the bundled message comprises a plurality of connection requests, implementing the plurality of connection requests to configure the first switch node for a plurality of connections; and (d) when the bundled message comprises a plurality of failure notifications, initiating restoration processing for a plurality of connections.

* * * * *

UNITED STATES PATENT AND TRADEMARK OFFICE
CERTIFICATE OF CORRECTION

PATENT NO. : 7,406,074 B2
APPLICATION NO. : 10/193932
DATED : July 29, 2008
INVENTOR(S) : Bharat T. Doshi and Ramesh Nagarajan It is certified that error appears in the above-identified patent and that said Letters Patent is hereby corrected as shown below:

In Column 11, on line 51, replace "plurality" with --plurality of--.

In Column 12, on line 8, replace "plurality" with --plurality of--.

Signed and Sealed this

Tenth Day of February, 2009

JOHN DOLL
*Acting Director of the United States Patent and Trademark Office*